Aug. 12, 1941.  W. H. HARSTICK  2,252,373
CLUTCH
Filed Jan. 13, 1940  2 Sheets-Sheet 2

INVENTOR
WILLIAM H. HARSTICK
BY Paul O. Pippel
ATTY.

Patented Aug. 12, 1941

2,252,373

UNITED STATES PATENT OFFICE 2,252,373

CLUTCH

William H. Harstick, Richmond, Ind., assignor to International Harvester Company, a corporation of New Jersey Application January 13, 1940, Serial No. 313,731

9 Claims. (Cl. 74—407)

This invention relates to a clutch. More specifically it relates to a clutch for a motor drive for a cream separator.

Clutches are well known which connect a source of power with a device such as a cream separator and operate in such a manner that, as soon as the source of power cuts off, the clutch is disconnected, and the device is permitted to coast independently of the source of power. These clutches may include as one element a spiral gear which upon being driven has force applied to it so as to cause an engagement of the clutch. When power is no longer supplied, the driven side of the clutch connected with the device such as a cream separator, tends to drive the normal driving side, including the spiral gear, and, consequently, the gear is urged in the opposite direction, and the clutch is disengaged.

An object of the present invention is to provide an improved clutch.

A further object is the provision of a clutch connecting an electric motor and a cream separator, which clutch will disengage as soon as the electric motor is not driving.

According to the present invention there are provided a spiral gear, a clutch plate, and a gear member adapted to engage the clutch plate. The spiral gear has sloping projections which fit into corresponding shaped recesses in the plate, and the gear and the plate are secured so as to be permitted a limited angular movement. Upon being driven, the gear is urged toward the clutch plate and the gear member so as to cause the plate and gear member to engage. The engagement of the plate and the gear member effects a drag upon the plate member which results in a slight angular movement between the plate and the gear and a consequent movement of the plate away from the gear, because the projections on the gear move out of the recesses on the plate. The movement of the plate away from the gear causes a more positive engagement of the plate with the gear member and prevents slipping of the clutch.

In the drawings:

Figure 4 is a section taken along the line 4—4 of Figure 3;

Figure 5 is a section taken along the line 5—5 of Figure 3; and

Figure 1:
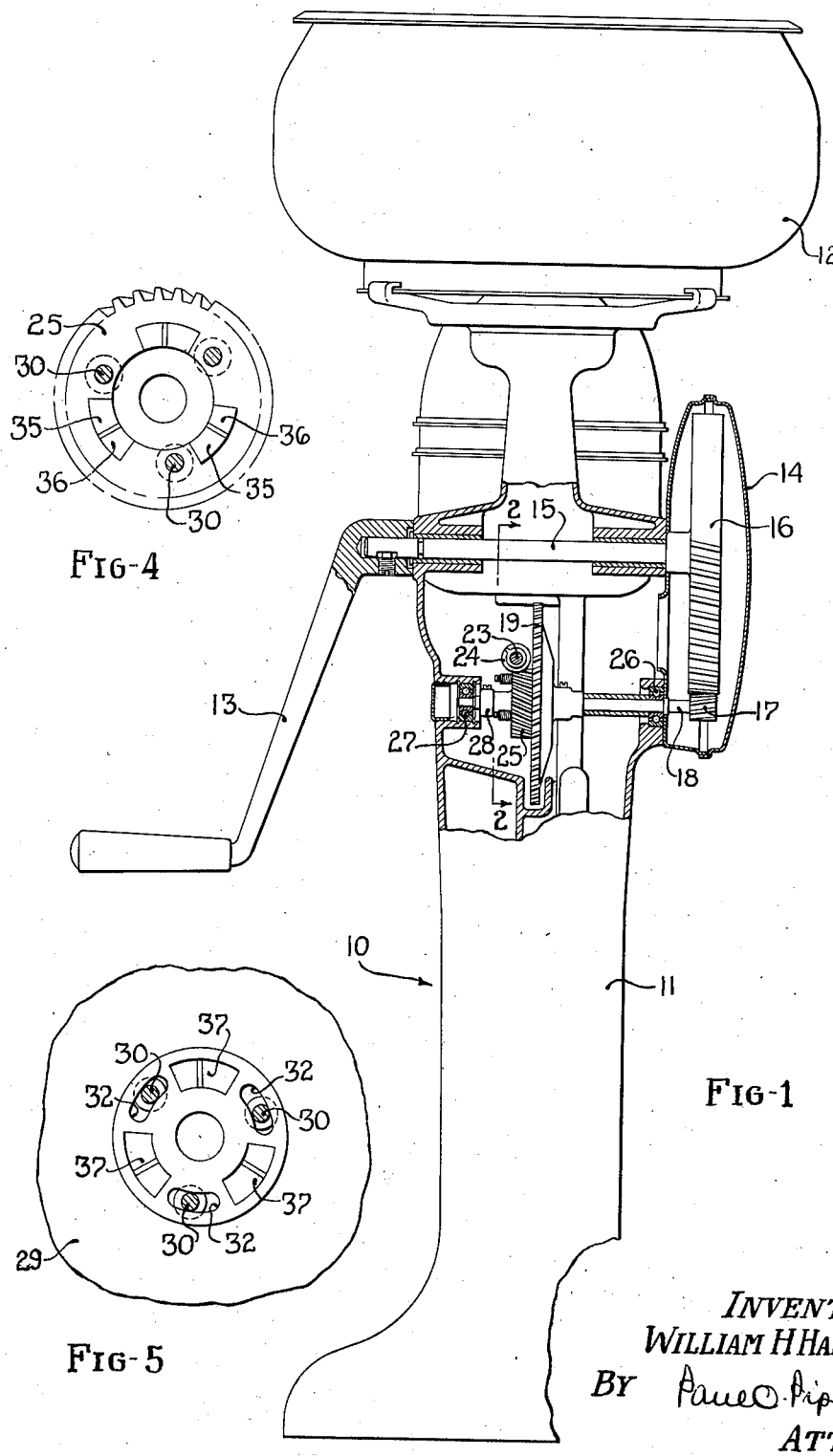
Figure 1 is a side elevation, partly in section, of a cream separator.

The reference numeral 10 denotes a cream separator which includes a base 11, a milk supply can 12, a crank 13, and a gear case 14. The crank 13 is secured to a shaft 15, secured in turn to a gear 16 by means of a clutch, not shown. The gear 16 is in mesh with a pinion 17 secured to a shaft 18, upon which is secured a gear 19 in mesh with a vertical driving spindle 20 of a cream separator bowl, not shown. It will be seen that the aforementioned parts constitute means by which the cream separator bowl may be driven by hand. The crank 13 turns the shaft 15 and gear 16; thereby the pinion 17, the shaft 18, and the gear 19 are turned and with them the spindle 20 meshing with the gear 19. The clutch connecting the shaft 15 and the gear 16 is of such a type that rotation of the shaft 15 in one direction causes the gear 16 to be driven and driving of the gear 16 will not drive the shaft 15. The details of the clutch are not shown since they form no part of the present invention.

Figure 2:
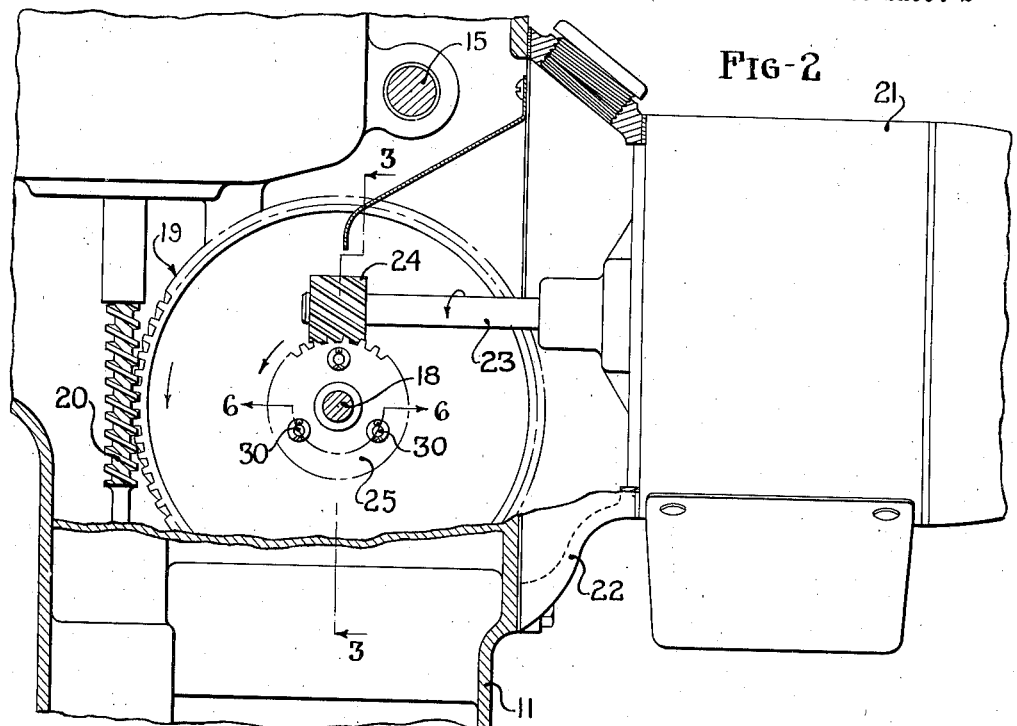
Figure 2 is a section taken along the line 2—2 of Figure 1.

As shown in Figure 2, an electric motor 21 is secured by means of a bracket 22 to the base 11 of the cream separator. A shaft 23 projects from the motor and has a spiral gear 24 secured to its end, in mesh with a spiral gear 25 mounted upon the shaft 18. The shaft 18 is carried in ball bearings 26 and 27. A set collar 28 is secured to the shaft 18 to one side of the shaft 18, and a plate 29 is positioned on the other side of the gear 25. The gear 25 and plate 29 are secured together by means of three pins 30 which pass through circular openings 31 in the gear 25 and arcuate slots 32 in the plate 29. A coil spring 33 surrounds each pin 30 and holds the plate 29 yieldingly in engagement with the plate 29. On one side of the gear 25 are three projections 34, each of which has a slightly sloping surface 35 and a steeply sloping surface 36. The plate 29 has three recesses 37 into which the projections 34 of the gear 25 fit. The plate has a peripheral frusto-conical surface 38 engaging a frusto-conical surface 39 on a gear member 40 secured to the shaft 18.

Figure 6:
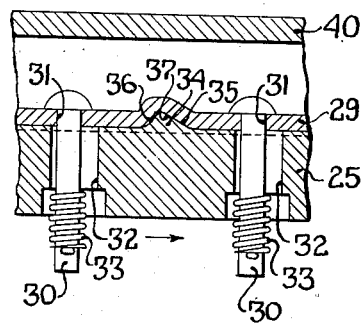
Figure 6 is a section taken along the line 6—6 of Figure 2.
Figure 3:
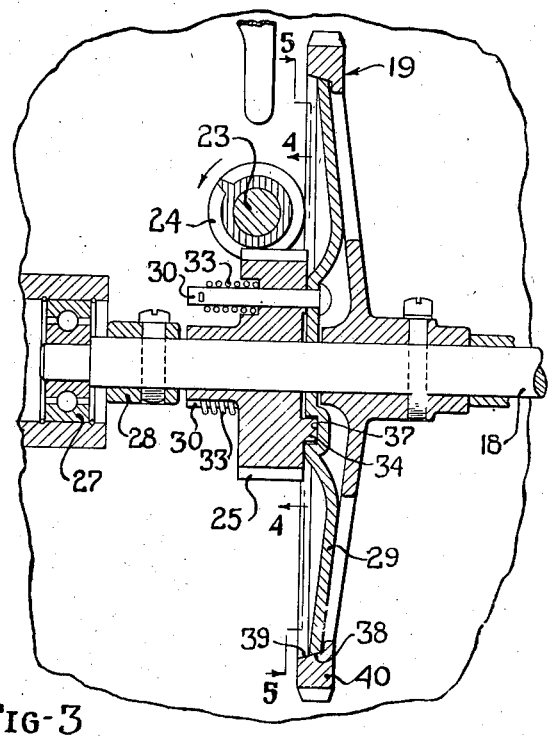
Figure 3 is a section taken along the line 3—3 of Figure 2.

The electric motor 21 is rotated in the direction shown by the arrows of Figures 2 and 3. The gear 24 drives the gear 25 in a counterclockwise direction as shown in Figure 2 and urges the gear 25 toward the plate 29 and the gear member 40. The plate 29 extends to rotate with the gear 25, and the engagement of the surface 38 from the plate 29 with the surface 39 of the gear member 40 causes a slight slowing of the plate 29. A slight movement of rotation between the gear 25 and the plate 29 results in such movement being permitted by the arcuate slots in the plate through which the pins 30 connecting the gear and plate pass. The rotation of the gear 25, being in the direction shown by the arrow in Figure 6, the projection 34 tends to move out of the recess 37, this being permitted because the movement is along the slightly sloping surface 35 of the projection 34 and the corresponding shaped surface of the recess 37. Contact of the gear 25 with the collar 28 prevents movement of the gear away from the plate 29 and the result is that the plate 29 moves away from the gear 25 in the direction of the gear member 40 and causes a more effective engagement between the surfaces 39 and 40 of the plate and gear member. This slight movement of the plate 29 away from the gear 25 because of movement of the projections 34 out of the recesses 37, insures against slipping between the plate 29 and the gear member 40.

It has been found in a construction wherein the plate 29 was secured to the gear 25, with no provision for a slight movement of the plate away from the gear, that often the force exerted by the gear 24 axially of the gear 25 was insufficient to cause a driving engagement between the surfaces 38 and 39 of the plate 29 and the gear member 40. Consequently, there was slipping between the plate and the gear member, because of insufficient engagement of the members. However, with the construction of the present invention, the initial engagement of the plate 29 and the gear member, though possibly insufficient for proper driving engagement, produces a slight angular displacement of the plate 29 with respect to the gear 25 and thereby a slight axial displacement of the plate with respect to the gear, which makes more positive the engagement between the plate 29 and the gear member 40.

When the electric motor 21 is shut off, the gear member 40 tends to drive the plate 29 and gear 25, which drives the gear 24. The result is a reversal of force between the gears 24 and 25, and the gear 25 moves to the left against the thrust collar 28 and the plate member 29 is disengaged from the gear member 40. As a result, the cream separator coasts without driving engagement with the motor. The same result is had when the separator is driven by means of the crank 13. The gear 25 drives the gear 24, and the gear 25 can move to the left as viewed in Figure 3 so as to take the plate 29 out of engagement with the gear member 40.

It will be apparent from the foregoing description that a new and novel clutch construction has been provided. The intention is to limit the invention only within the scope of the appended claims.

What is claimed is:

1. In combination, a shaft carrying a collar, a spiral gear rotatably mounted on the shaft adjacent the collar and being permitted axial movement away from the collar, means engaging the spiral gear for rotating the same and for moving the same axially away from the collar, a plate positioned at the side of the gear away from the collar and secured to the gear for limited axial movement away from the gear and for limited angular movement with respect to the gear, there being wedges on the gear fitting into recesses in the plate, and a gear secured to the shaft and adapted to have driving engagement with the plate upon axial movement of the plate toward the last mentioned gear.

2. In combination, a support carrying an abutment, a first member rotatably mounted on the support adjacent the abutment and adapted to have movement away from the abutment, a second member positioned on the side of the first member away from the abutment and secured to the first member for limited movement away from the first member and for limited angular movement with respect to the first member, the one member having wedges fitting into recesses in the other member, and a third member mounted on the support adjacent the second member, and means for rotating the first member and for moving it away from the abutment, whereby the second member moves into clutching engagement with the third member.

3. In combination, a shaft having an abutment, a spiral gear rotatably mounted on the shaft adjacent the abutment and being permitted axial movement away from the abutment, a plate having a frusto-conical periphery and being secured at the side of the spiral gear away from the abutment for limited axial movement away from the gear and for limited angular movement with respect thereto, means formed in the adjacent sides of the spiral gear and the plate for causing an axial movement of the plate away from the spiral gear upon an angular movement of the plate with respect to the gear, and a second gear secured to the shaft and having a frusto-conical surface adapted to have clutching engagement with the frusto-conical surface of the plate, and means engaging the spiral gear for rotating and moving the same axially away from the abutment and to cause engagement of the frusto-conical surfaces of the plate and the second gear.

4. In combination, a support, a first member rotatably mounted on the support and adapted to have axial movement with respect to the support, a second member secured to the first member for limited axial movement and limited angular movement with respect to the first member, means formed in adjacent portions of the first and second members for causing axial movement of the members away from one another upon relative angular movement in one direction between the members, a third member mounted on the support and adapted to have clutching engagement with the second member, and means for rotating the first member and simultaneously moving the first member axially and thereby causing clutching engagement of the second and third members.

5. In combination, a support, a first member rotatably mounted on the support and adapted to have axial movement with respect to the support, a second member secured to the first member for limited axial movement and limited angular movement with respect to the first member, means for causing axial movement of the members away from one another upon relative angular movement in one direction between the members, said means comprising a plurality of projections on the side of one member each having a surface at a very small acute angle with respect to the surface of a plane at right angles with respect to the axis of rotation of the members and further comprising mating recesses in the side of the other member into which the projections extend, a third member mounted on the support and adapted to have clutching engagement with the second member, and means for rotating the first member and simultaneously moving the first member axially and thereby causing clutching engagement of the second and third members.

6. The combination as set forth in claim 5, the first member having the projections and the second member having the recesses.

7. In combination, a support, a driving member rotatably mounted on the support for limited axial movement with respect thereto, an intermediate member secured to the driving member for rotation therewith and for limited axial and limited angular movement with respect thereto, means between said members operative to provide relative axial movement upon limited relative angular movement, a driven member mounted for rotation and against axial movement coaxially with the driving member, and clutching means between the intermediate member and the driven member, said intermediate member being engageable with said driven member upon movement away from the driving member.

8. In combination, a support, a driving member rotatably mounted on the support for limited axial movement with respect thereto, means for rotating and simultaneously moving said member axially on the support, an intermediate member secured to the driving member for rotation therewith and for limited axial and limited angular movement with respect thereto, means between said members operative to provide relative axial movement upon limited relative angular movement, a driven member mounted for rotation and against axial movement coaxially with the driving member, and clutching means between the intermediate member and the driven member, said intermediate member being engageable with said driven member upon movement away from the driving member.

9. In combination, a support, a driving member rotatably mounted on the support for limited axial movement with respect thereto, an intermediate member secured to the driving member for rotation therewith and for limited axial and limited angular movement with respect thereto, resilient means for holding said members against relative axial movement, means between said members operative to provide relative axial movement upon limited relative angular movement, a driven member mounted for rotation and against axial movement coaxially with the driving member, and clutching means between the intermediate member and the driven member, said intermediate member being engageable with said driven member upon movement away from the driving member.

WILLIAM H. HARSTICK.